United States Patent
Takahashi et al.

(10) Patent No.: US 12,411,013 B2
(45) Date of Patent: Sep. 9, 2025

(54) MOBILE BODY, METHOD OF CONTROLLING MOBILE BODY, AND PROGRAM

(71) Applicant: SONY GROUP CORPORATION, Tokyo (JP)

(72) Inventors: Yusuke Takahashi, Kanagawa (JP); Ryo Watanabe, Tokyo (JP); Yukihiro Saito, Tokyo (JP); Masaomi Nabeta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 499 days.

(21) Appl. No.: 17/299,366

(22) PCT Filed: Dec. 3, 2019

(86) PCT No.: PCT/JP2019/047290
§ 371 (c)(1),
(2) Date: Jun. 3, 2021

(87) PCT Pub. No.: WO2020/121900
PCT Pub. Date: Jun. 18, 2020

(65) Prior Publication Data
US 2022/0019224 A1    Jan. 20, 2022

(30) Foreign Application Priority Data

Dec. 10, 2018   (JP) ................................ 2018-231033

(51) Int. Cl.
*G01C 22/00*        (2006.01)
*B60W 60/00*        (2020.01)
(Continued)

(52) U.S. Cl.
CPC ........... *G01C 21/28* (2013.01); *B60W 60/001* (2020.02); *G01C 21/1656* (2020.08);
(Continued)

(58) Field of Classification Search
CPC .. G05D 1/0297; G05D 1/0278; G05D 1/0272; G05D 1/0274; G05D 1/024;
(Continued)

(56) References Cited

U.S. PATENT DOCUMENTS 11,199,853 B1 *   12/2021   Afrouzi .................. B25J 13/006
2006/0129276 A1 *  6/2006   Watabe .................. G05D 1/024
                                                              701/23
(Continued)

FOREIGN PATENT DOCUMENTS

JP   H06-348971 A   12/1994
JP   2015170127 A    9/2015
(Continued)

OTHER PUBLICATIONS

Meimei Gao et al., Control Strategy Selection for Autonomous Vehicles in a Dynamic Environment, 2005 IEEE International Conference on Systems, Man and Cybernetics, Oct. 2005, pp. 1-6, IEEE.

*Primary Examiner* — Adam M Alharbi
(74) *Attorney, Agent, or Firm* — Paratus Law Group, PLLC

(57) ABSTRACT

A mobile body controller according to the present disclosure includes circuitry configured to recognize an environment surrounding a mobile body to be controlled, and change parameters used for self-position estimation by the mobile body based on the recognized environment.

12 Claims, 12 Drawing Sheets

(51) Int. Cl.
   *G01C 21/16* (2006.01)
   *G01C 21/28* (2006.01)
   *G05D 1/00* (2006.01)

(52) U.S. Cl.
   CPC ........... *G05D 1/0212* (2013.01); *G05D 1/024* (2013.01); *G05D 1/0272* (2013.01); *G05D 1/0274* (2013.01); *G05D 1/0278* (2013.01)

(58) Field of Classification Search
   CPC ............... G05D 1/0212; G05D 1/0253; G06Q 10/063114; G06Q 10/06316; G06Q 10/0835; G01C 21/28; G01C 21/1656; B60W 60/001
   See application file for complete search history.

(56) References Cited

U.S. PATENT DOCUMENTS

| | | | |
|---|---|---|---|
| 2017/0167881 A1* | 6/2017 | Rander | G05D 1/0274 |
| 2018/0003516 A1* | 1/2018 | Khasis | G08G 1/207 |
| 2018/0204338 A1 | 7/2018 | Narang et al. | |
| 2020/0097006 A1* | 3/2020 | Liu | G05B 19/4155 |

FOREIGN PATENT DOCUMENTS

| | | |
|---|---|---|
| JP | 2017109781 | 6/2017 |
| JP | 2018206004 A | 12/2018 |
| WO | WO-2016059930 A1 | 4/2016 |

* cited by examiner

MOBILE BODY, METHOD OF CONTROLLING MOBILE BODY, AND PROGRAM

CROSS REFERENCE TO RELATED APPLICATIONS

This application is a National Stage Patent Application of PCT International Patent Application No. PCT/JP2019/047290 filed on Dec. 3, 2019 under 35 U.S.C. § 371, which claims the benefit of Japanese Priority Patent Application JP 2018-231033 filed on Dec. 10, 2018, the entire contents of which are incorporated herein by reference.

TECHNICAL FIELD

The present disclosure relates to a mobile body, a method of controlling a mobile body, and a program.

BACKGROUND ART

In related art, PTL 1 below, for example, describes estimating a position and an attitude of a mobile body using map data of a traveling environment and geometric data which is a sensing result of a distance sensor unit, and switching a traveling mode between a state in which the position and attitude of the mobile body are fixed uniquely and a state in which the position and attitude of the mobile body are not fixed uniquely.

CITATION LIST

Patent Literature

PTL 1: JP 6348971 B2

SUMMARY

Technical Problem

However, the technique described in the patent literature above assumes switching the traveling mode in accordance with the environment, but allows the state in which the position and attitude of the mobile body are not fixed uniquely, and thus involves a probability that the mobile body itself cannot recognize its own position (loses its own position).

Thus, it has been requested to increase the localization accuracy without being affected by changes in traveling environment.

Solution to Problem

According to an aspect of the present disclosure, there is provided a mobile body controller including: circuitry configured to recognize an environment surrounding a mobile body to be controlled, and change parameters used for self-position estimation by the mobile body based on the recognized environment.

Further, according to another aspect of the present disclosure, there is provided a mobile body including: one or more sensors; and a mobile body controller, the mobile body controller including circuitry configured to recognize an environment surrounding the mobile body controlled by the mobile body controller, and change parameters used for self-position estimation by the mobile body based on the recognized environment.

Further, according to another aspect of the present disclosure, there is provided a mobile body control method including: recognizing an environment surrounding a mobile body to be controlled; and changing parameters used for self-position estimation by the mobile body based on the recognized environment.

DESCRIPTION OF EMBODIMENTS

Figure 1:
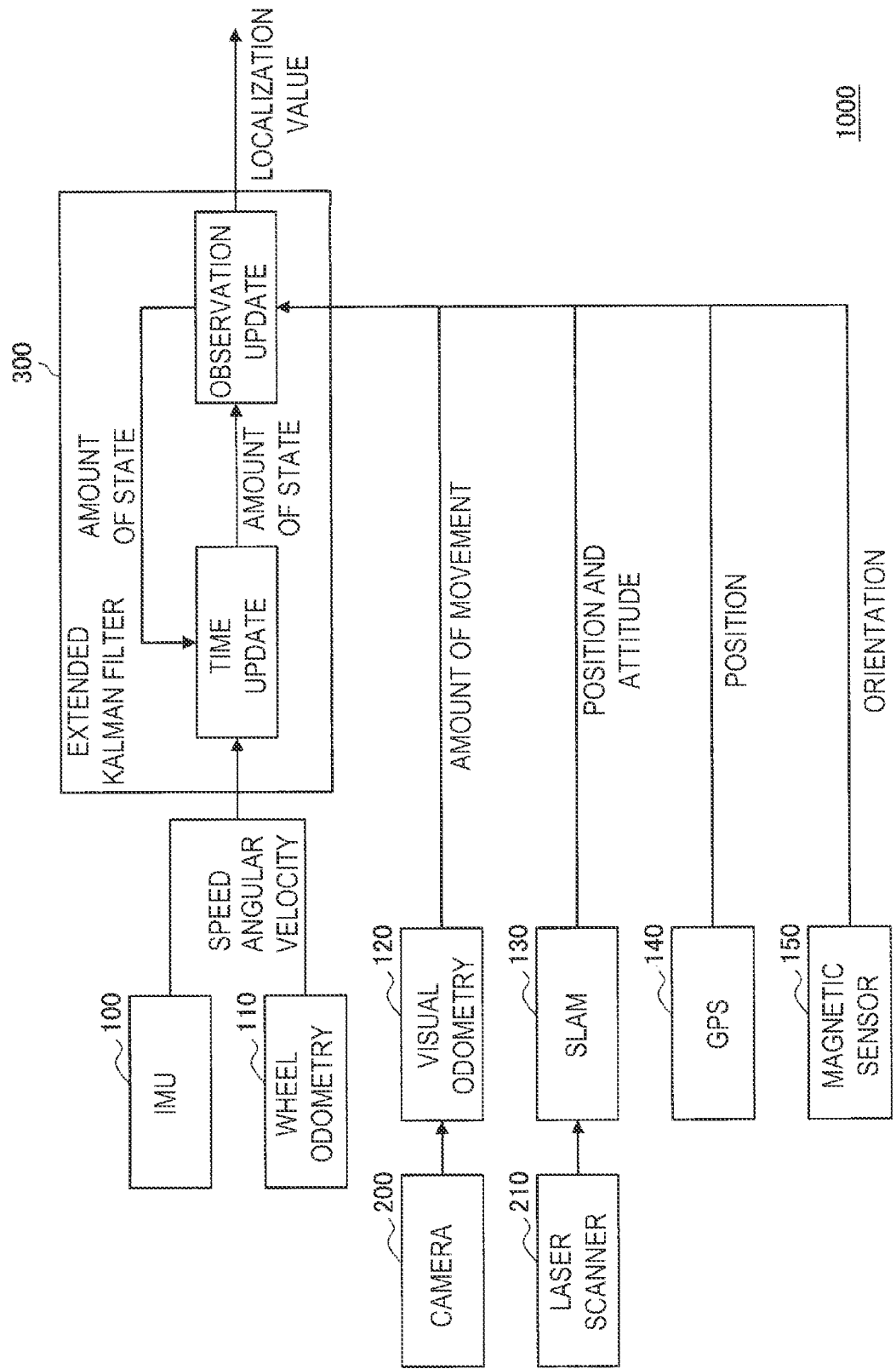
FIG. 1 is a schematic view showing a configuration of a mobile body controller according to an embodiment of the present disclosure.

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Overview of present disclosure
2. Method of localization
2.1. Dead reckoning
2.2. SLAM
2.3. Visual odometry
2.4. GPS
2.5. Wheel odometry
2.6. IMU
3. Localization by extended Kalman filter 4. Examples of parameter in accordance with environment
   4.1. Environment in which nothing exists in surroundings
   4.2. Sandy place
   4.3. Outdoor environment surrounded by buildings
   4.4. Corridor environment adjacent to glass walls
   4.5. Office environment with many repeated patterns
5. Method of changing parameter
   5.1. Example of embedding environmental information in advance map
   5.2. Case in which mobile body itself recognizes environment
   5.3. Example of embedding environmental information in advance map and performing path planning in accordance with sensor situation 1. Overview of Present Disclosure When making an autonomous movement, a mobile body such as a robot generates a surrounding environment map in advance, estimates its own position on the map on the basis of sensing information, and travels toward a destination. On this occasion, an amount of control is calculated with reference to the estimated position of the mobile body and a path directed to the destination. Therefore, the localization accuracy is an important factor that determines whether or not autonomous traveling can be performed.

Various techniques exist as localization techniques, which are great research themes in robotics. The respective localization techniques are good at and poor at different environments in terms of properties of used sensors and algorithms. In addition, since many setting parameters exist in the respective techniques, tuning in accordance with the environment is necessary in some cases.

In addition, in a case of assuming improving robustness of localization by sensor fusion, it is desirable to also tune a parameter that determines the weight of sensors to be utilized for fusion in accordance with the environment. Consequently, in order to move autonomously across a plurality of traveling environments having different properties, it is desirable to change the localization technique and parameter appropriately in accordance with the respective environments.

In an embodiment, concerning localization of a mobile body such as a robot, setting parameters for localization tuned to environments different in properties are changed dynamically in accordance with an environment in which the mobile body is traveling in order to achieve highly robust localization. Accordingly, a setting parameter for localization, used sensors, a localization algorithm, and processing settings are changed. Note that a mobile body that travels with wheels on the ground is shown as an example in an embodiment, but the mobile body may be a flying drone or the like.

2. Method of Localization

As a method of localization, dead reckoning, simultaneous localization and mapping (SLAM), visual odometry (VO), global positioning system (GPS), wheel odometry, and inertial measurement unit (IMU) below will be shown as examples. Note that the method of localization is not limited to them, but another method may be used. Hereinafter, characteristics of the respective methods will be described.

2.1. Dead Reckoning

Dead reckoning is a technique for estimating a relative position of a mobile body utilizing an internal sensor. By integrating and accumulating the speed or angular velocity obtained from an inertial sensor or a wheel odometry, an amount of movement of the mobile body itself is obtained from a reference point (original point). Although errors may be increased with time since the amount of movement is accumulated, a continuous and precise position of the mobile body can be estimated if only for a relatively short while.

2.2. SLAM

SLAM is a technique for simultaneously estimating a position of a mobile body and a surrounding map using a laser scanner or a camera. The position of the mobile body is estimated while resolving a contradiction in view of how the surroundings of the mobile body are seen and the amount of movement of the mobile body, and an environment map is generated at the same time. In an environment without any characteristic feature, SLAM has a characteristic in which the localization accuracy decreases because correction with a map is difficult. In addition, SLAM has a property in which the localization accuracy decreases in the vicinity of glass, a mirror, or the like because noise is included in an observed value of a laser scanner.

2.3. Visual Odometry

Visual odometry is a technique for estimating an amount of movement of a mobile body from an amount of changes with time of a feature amount within a camera image. The distance order may be different from actual measurement depending on camera calibration. A distance close to an actual measurement value can be obtained by utilizing stereoscopy, but the accuracy is relatively low in some cases. In addition, sight of a characteristic point may be lost in a light and dark environment, and the localization accuracy also decreases in some cases. In addition, it may also be difficult to extract the feature amount in a case where an image is blurred.

2.4. GPS

GPS is a technique for receiving a signal emitted from a satellite to estimate a position of a receiver in a triangulation way. The absolute coordinates on the globe can be directly measured outdoors. In the vicinity of a building, a positioning error may occur because of an influence exerted by multipath such as a reflected wave or a diffracted wave. In addition, the positioning accuracy in an environment surrounded by high-rise buildings where a signal reaches incompletely is low.

2.5. Wheel Odometry

Wheel odometry is a technique for measuring and accumulating an amount of rotation of a tire to calculate an amount of movement of a mobile body, and is a kind of dead reckoning. Since an error occurs in the position of the mobile body when the tire slips, the localization accuracy may degrade on a slippery ground surface.

2.6. IMU

IMU is called an inertial measurement unit, and detects an acceleration or an angular velocity. IMU is utilized when estimating an attitude of a mobile body and predicting a state in a current epoch from a state in a previous epoch. In the Kalman filter, IMU is often utilized when in processing called prediction update processing and time update processing.

3. Localization by Extended Kalman Filter

In a case where a mobile body travels in an actual environment, various environments are assumed. Indoor examples include an environment in which there are many objects and a characteristic point is easy to extract, an environment in which there are many mirrors or glass, and a sensor such as a laser scanner is difficult to use, an environment without characteristics, such as a corridor, and the like.

In addition, outdoor examples include an environment in which there are many buildings in the neighborhood, and noise is easily included in a GPS signal, an environment in which nothing exists in the surrounding, such as a square, an environment in which the traveling surface is sandy, and wheels are likely to slip, and the like.

In such environments having different properties, it is desirable to perform localization with an optimized parameter using sensors of a combination suited to each of the environments. In an embodiment, a plurality of sensors and a plurality of localization techniques are fused by an extended Kalman filter.

FIG. 1 is a schematic view showing a configuration of a system 1000 of a mobile body according to an embodiment of the present disclosure. As shown in FIG. 1, this system 1000 has an IMU 100, a wheel odometry 110, a visual odometry 120, an SLAM 130, and a GPS 140 as functional blocks that perform localization. In addition, the system 1000 has a magnetic sensor 150, a camera 200, and a laser scanner 210 as functional blocks (sensors) that perform localization. The camera 200 is utilized by the visual odometry 120, and the laser scanner 210 is utilized by the SLAM 130. In addition, the magnetic sensor 150 detects an orientation. In addition, the system 1000 has an extended Kalman filter 300 that fuses these localization techniques. Note that the respective structural elements of the system 1000 shown in FIG. 1 can be configured from hardware such as sensors or circuits, or a central processing unit such as CPU, and a program for causing this to function. The same applies to FIGS. 4, 6, and 9 which will be described later.

As an example, in localization through use of the extended Kalman filter 300, a position of the mobile body in the current time sample is predicted from a previous time sample by dead reckoning by means of the IMU 100 and the wheel odometry 110, and a predicted value is corrected using observed values acquired in the current time sample to estimate the position of the mobile body. Prediction of the position of the mobile body in the current time sample from the previous time sample is performed in a time update block 310. In addition, correction of the predicted value through use of the observed values acquired in the current time sample is performed in an observation update block 320. Note that the observed values are mainly obtained from the visual odometry 120, the SLAM 130, the GPS 140, and the magnetic sensor 150, and are fused on the basis of a covariance value.

In an embodiment, in order to obtain the predicted value, internal sensors such as the IMU 100 and the wheel odometry 110 are utilized. The extended Kalman filter 300 can integrate various sensor values and localization techniques by appropriately defining a model that represents a relation between observed values and an estimated value. However, covariance of the respective observed values is appropriately set as a setting parameter that determines the reliability of the observed values. As the covariance value is smaller, sensor values and localization with higher reliability are achieved, and as the covariance value is larger, sensor values and localization with lower reliability are achieved. An embodiment shows an example of dynamically changing the covariance value of the extended Kalman filter 300 in accordance with a traveling environment of the mobile body.

4. Examples of Parameter in Accordance with Environment

Figure 2A:
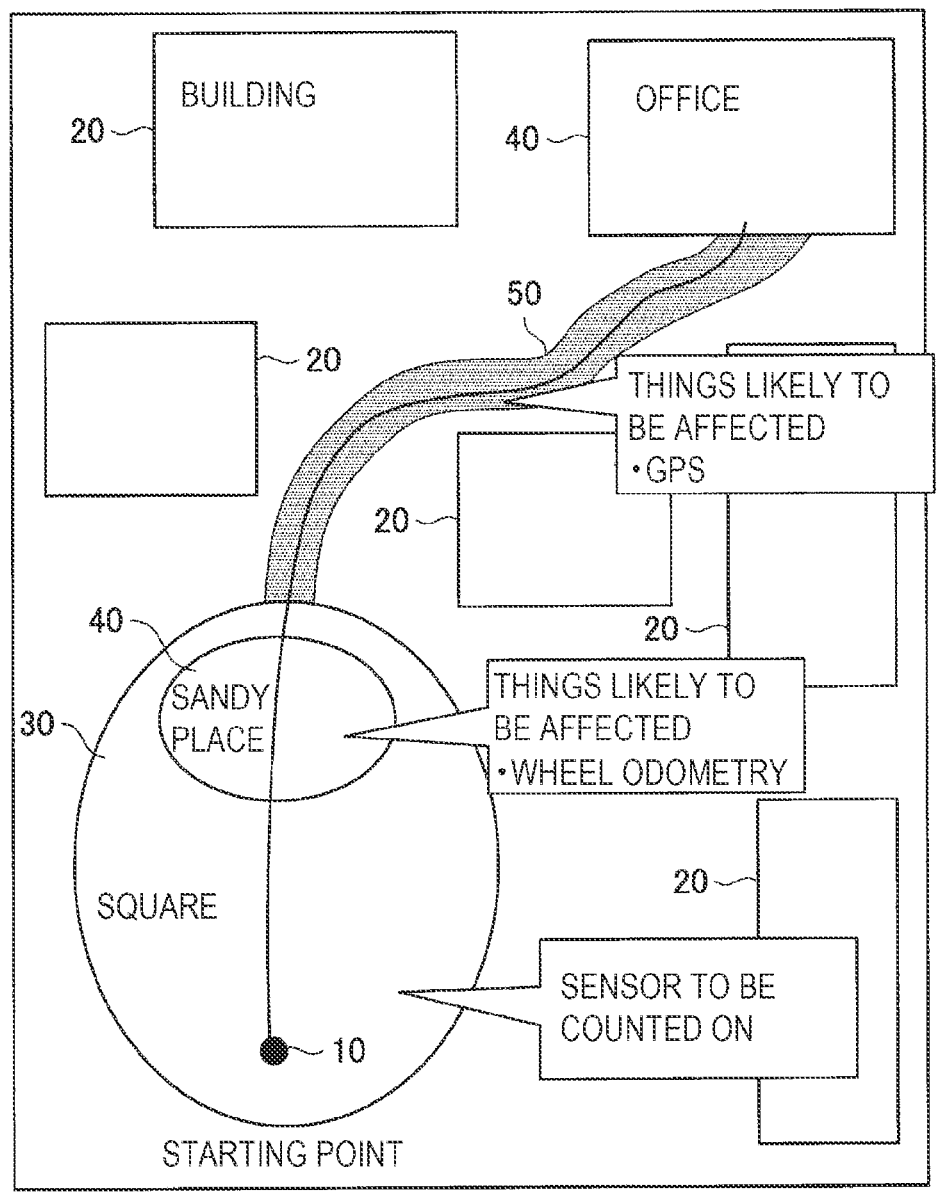
FIG. 2A is a schematic view showing a route along which a mobile body travels.
Figure 2B:
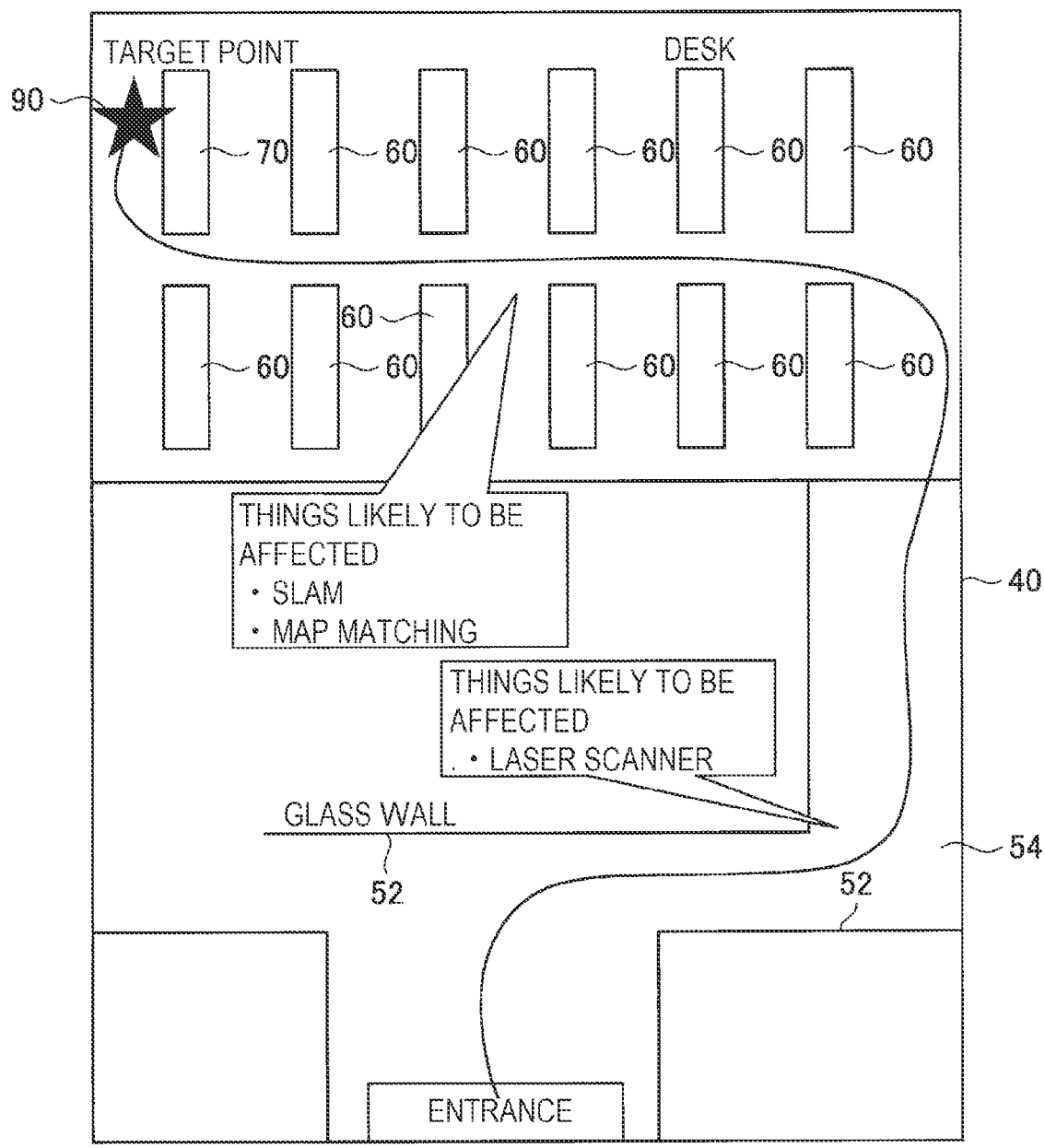
FIG. 2B is a schematic view showing a route along which a mobile body travels.

FIGS. 2A and 2B are schematic views showing routes along which a mobile body 10 travels. As shown in FIGS. 2A and 2B, the mobile body 10 first passes through a square 30 to a sandy place 40, follows a road 50 surrounded by buildings 20 nearby, and enters into a building 40 including an office.

FIG. 2B shows the inside of the building 40. The mobile body 10 follows a corridor 54 with glass walls 52 existing laterally, and passes between desks 60 to reach a target point 90 (a seat 70).

As shown in FIG. 1, sensors used for localization of an autonomous mobile body shall be the IMU 100, the wheel odometry 110, the laser scanner 210, the GPS 140, the camera 200, and the magnetic sensor 150, and sensor fusion shall be performed in the extended Kalman filter 300. However, the laser scanner 210 shall utilize the SLAM 130 that performs ICP matching, and the camera 200 shall utilize the visual odometry 120.

Hereinafter, examples of parameter in accordance with the environment will be described in a case where the mobile body 10 travels along the paths shown in FIGS. 2A and 2B.

4.1. Environment in which Nothing Exists in Surroundings

In a case where the mobile body 10 travels outdoors, and travels in an environment in which there is no feature in the surroundings, the SLAM 130 is not useful because no outstanding landmark exists although there is no particular error factor. In such an environment, a positioning signal of the GPS 140 is also used mainly to perform localization. That is, when traveling through the square 30 in which no feature exists in the surroundings, it is less likely to be affected by multipath that will be an error factor of the GPS 140, so that the reliability of the GPS 140 is increased. Consequently, in the extended Kalman filter 300, it is desirable to make the covariance value of GPS smaller and make the covariance value of the SLAM 130 larger.

4.2. Sandy Place

In a case where the mobile body 10 travels the sandy place 40 which is an outdoor environment but has a slippery ground surface, the wheel odometry 110 is likely to produce an error, so that the reliability of dead reckoning performed by the wheel odometry 110 decreases. Thus, dead reckoning performed by the IMU 100 is utilized without utilizing the wheel odometry 110. In addition, since no feature exists in the surroundings at the sandy place 40 and the GPS 140 can be utilized similarly to the square 30, the covariance of the GPS 140 is continuously made smaller.

4.3. Outdoor Environment Surrounded by Buildings

Since a multipath error is included in a positioning solution of the GPS 140 in an outdoor environment such as the road 50 surrounded by the buildings 20, it is desirable to make the covariance value of the GPS 140 larger. In addition, since it is difficult to assume that a wheel of the mobile body 10 slips if the road 50 is paved, the covariance of the wheel odometry 110 is made smaller.

4.4. Corridor Environment Adjacent to Glass Walls

As shown in FIG. 2B, in a case where the mobile body 10 travels the corridor 54 adjacent to the glass walls 52, the GPS 140 is not used since it is indoor traveling. In addition, since the glass walls 52 transmit or reflect laser light, an error occurs in positioning information obtained by the laser scanner 210. Consequently, in such an environment with much glass, it is desirable to decrease the reliability of the SLAM 130 through use of the laser scanner 210. Thus, in the extended Kalman filter 300, the covariance of the position of the mobile body obtained from the SLAM 130 is set to be large.

4.5. Office Environment with Many Repeated Patterns

As shown in FIG. 2B, inside the building 40, there are many objects, and regular repeated patterns such as the desks 60 exist. Since a characteristic point is easy to extract in such an environment, it is suitable to utilize the visual odometry 120 and the SLAM 130. On the other hand, in a case where processing of matching with a map is included in the SLAM 130, it is an environment in which mismatching is likely to occur because regular repeated patterns exist. Consequently, it is effective to decrease a mismatching occurrence rate by stopping map matching processing in the SLAM 130 or slowing the cycle of the map matching processing, rather than setting the covariance of the extended Kalman filter 300.

Setting parameters in accordance with the environment in which localization is performed as in the above examples is suitable for robust localization. In addition, as in the example of an office environment with many repeated patterns, it is desirable not only to change the covariance matrix of the extended Kalman filter 300, but also to change a parameter in each of the localization techniques such as the SLAM 130.

5. Method of Changing Parameter

The examples of setting a parameter for localization in accordance with the environment have been described above. Hereinafter, techniques for actually changing a parameter for localization in accordance with a traveling environment will be described. In order to change the parameter for localization, the mobile body 10 needs to be supplied with information about a traveling environment in advance or the mobile body 10 itself needs to recognize the traveling environment.

Here, a technique for supplying a parameter for localization together with positional information about a destination that the mobile body 10 will utilize at the time of navigation, and a technique for the mobile body to recognize an external environment using an identification device for changing a parameter profile for localization will be described.

5.1. Example of Embedding Environmental Information in Advance Map

Figure 3A:
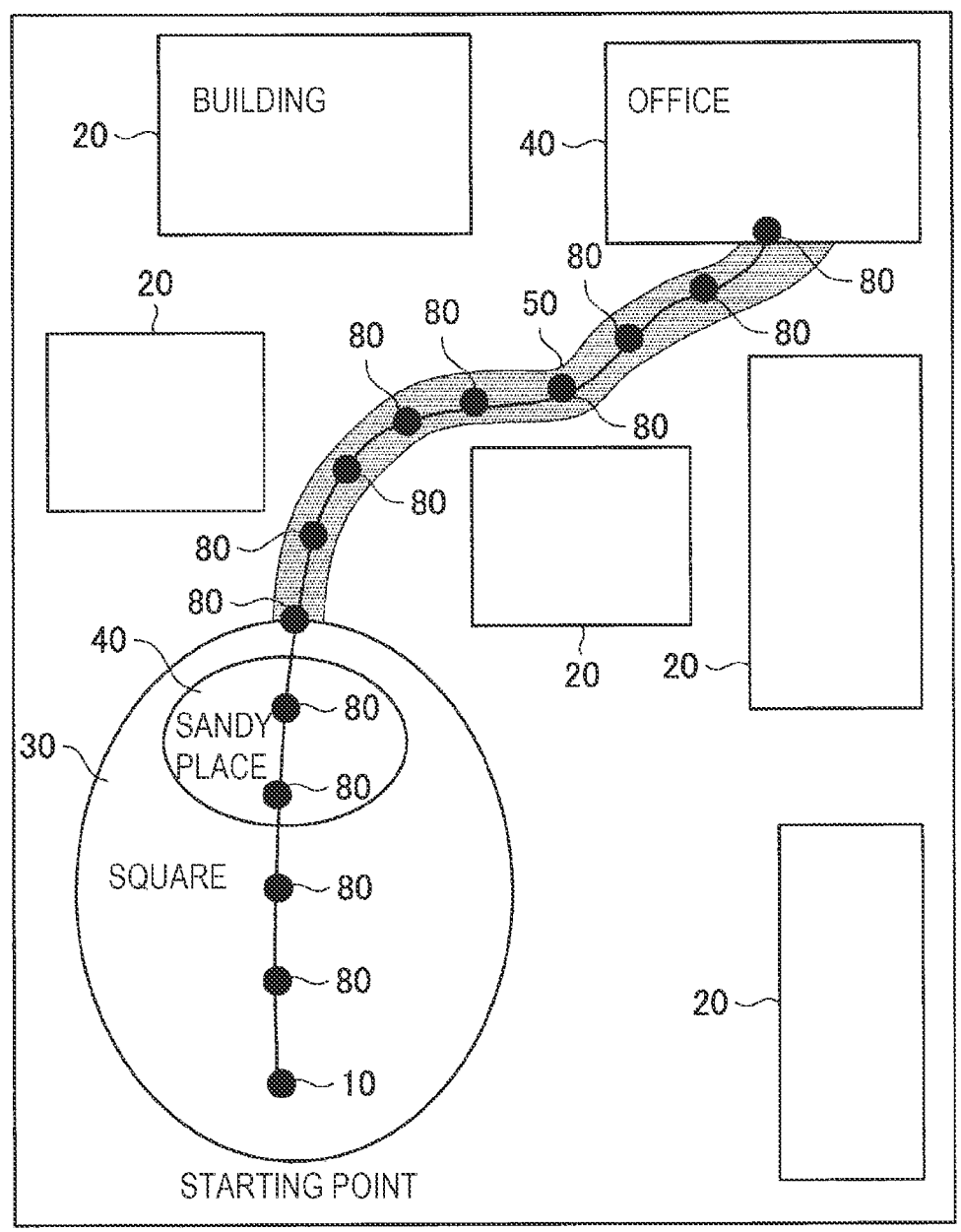
FIG. 3A is a schematic view showing target positions by dots when a mobile body travels along the paths shown in FIGS. 2A and 2B.
Figure 3B:
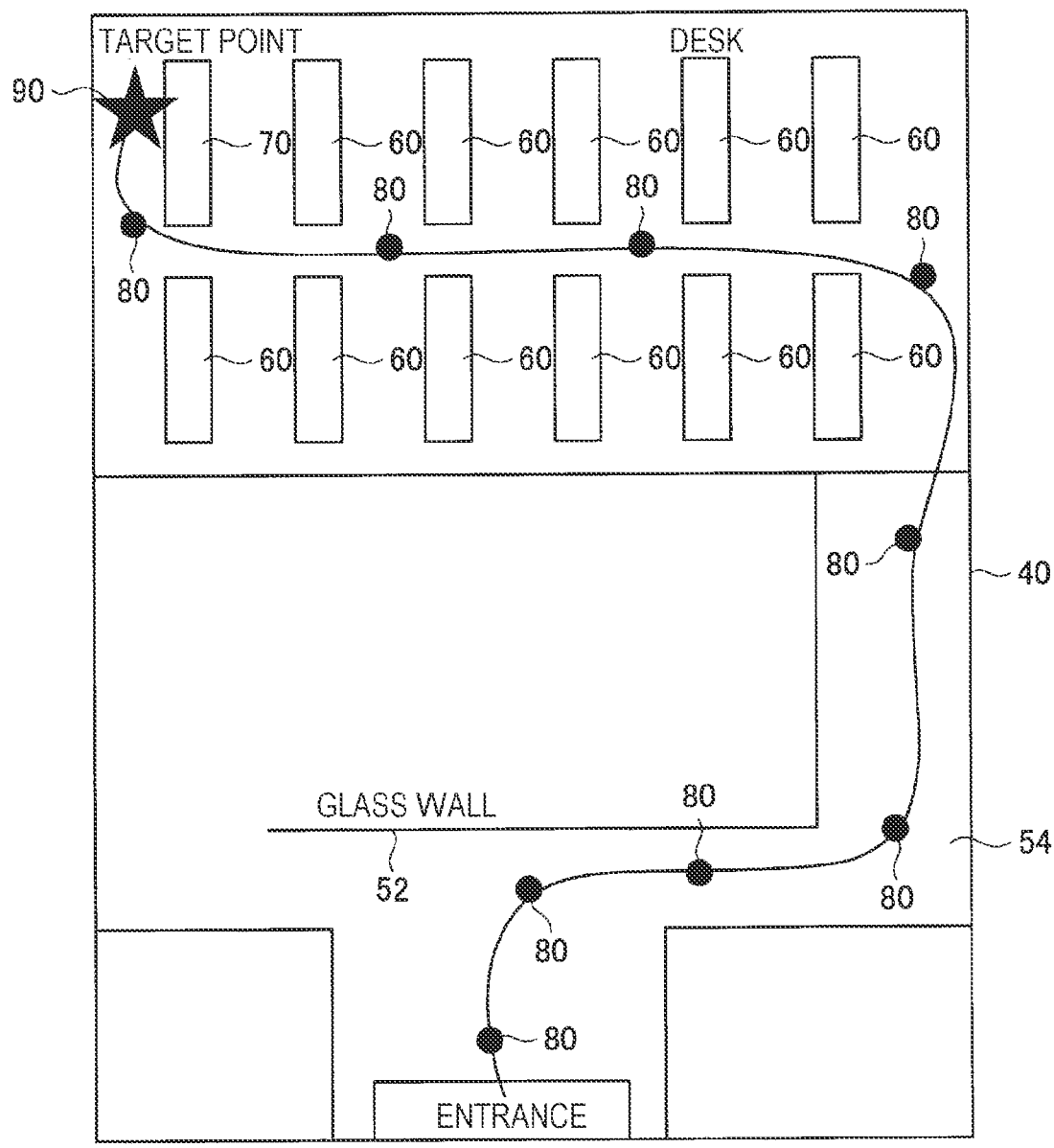
FIG. 3B is a schematic view showing target positions by dots when a mobile body travels along the paths shown in FIGS. 2A and 2B.

FIGS. 3A and 3B are schematic views showing target positions 80 by dots when the mobile body 10 travels along the paths shown in FIGS. 2A and 2B. When the mobile body 10 moves autonomously, the mobile body 10 is supplied with the target point 90 in advance. The mobile body 10 calculates a traveling path toward the target point 90 so as to avoid the surrounding obstacles on the basis of an environment map. At this time, a path searching algorithm is utilized, and when a target position is too far, the processing burden increases. Thus, the target positions 80 supplied to the mobile body 10 are set at intervals of about 10 m, for example, as shown in FIGS. 3A and 3B. In a case where an environment map is utilized for localization, information about the target positions 80 supplied to this mobile body 10 is plotted on the environment map. Here, the environment map on which the target positions 80 have been plotted shall be referred to as an advance map.

The advance map is obtained by adding waypoint information (information about the target positions 80) to the environment map. In an embodiment, a parameter for localization in accordance with the traveling environment is further embedded in advance in the advance map. Thus, the parameter for localization can be acquired from the advance map at a point corresponding to each of the target positions 80.

The mobile body 10 reads, together with information about the target position 80, a parameter for localization to be utilized when moving to that target position 80 from the advance map, and performs localization processing utilizing the parameter suited to the traveling environment. This parameter includes the propriety of used sensors, a covariance value of the extended Kalman filter 300, and settings necessary for each of the localization techniques such as the SLAM 130 described above.

Figure 4:
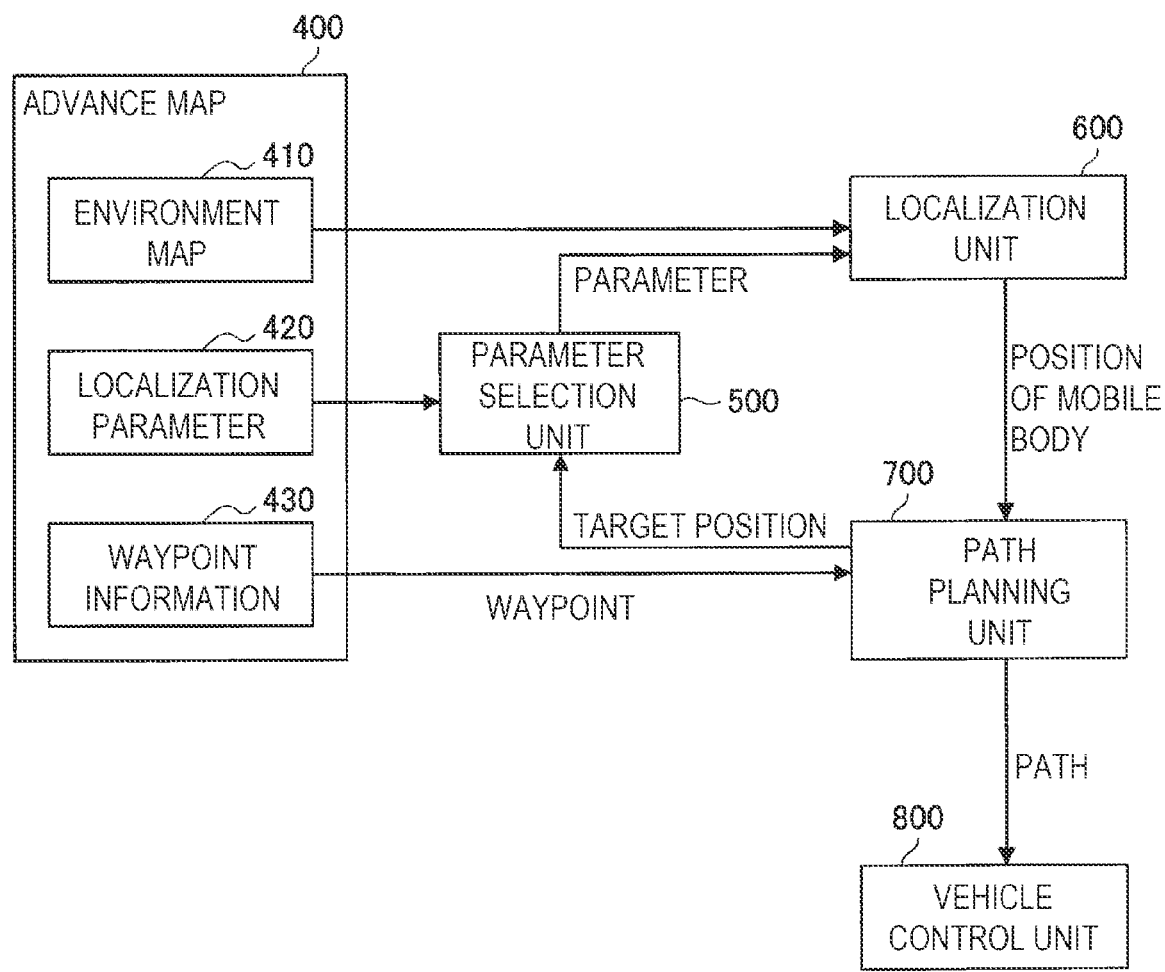
FIG. 4 is a schematic view showing a configuration of a system in a case of embedding environmental information in an advance map.

FIG. 4 is a schematic view showing a configuration of a system 2000 in a case of embedding environmental information in an advance map. As shown in FIG. 4, the system 2000 has an advance map 400, a parameter selection unit 500 (parameter changing unit), a localization unit 600, a path planning unit 700, and a vehicle control unit 800. In this example, the advance map 400 is prepared in advance, and the advance map 400 includes an environment map 410, a localization parameter 420, and waypoint information 430.

The localization unit 600 receives a parameter to be utilized for localization, and performs localization processing utilizing that parameter. The localization unit 600 corresponds to the system 1000 shown in FIG. 1. The parameter selection unit 500 receives destination information about which of the target positions 80 the path planning unit 700 is calculating a path for, selects the localization parameter 420 associated with that destination information, and passes the parameter to the localization unit 600.

The path planning unit 700 is equivalent to what is called a navigation device, and calculates a path along which the mobile body 10 intends to move. The path planning unit 700 calculates the path on the basis of the target position 80 and the position of the mobile body 10, and sends the calculated path to the vehicle control unit 800. In addition, as described above, the path planning unit 700 sends the target position 80 to the parameter selection unit 500. The vehicle control unit 800 controls the mobile body 10 so as to follow the path.

Figure 5:
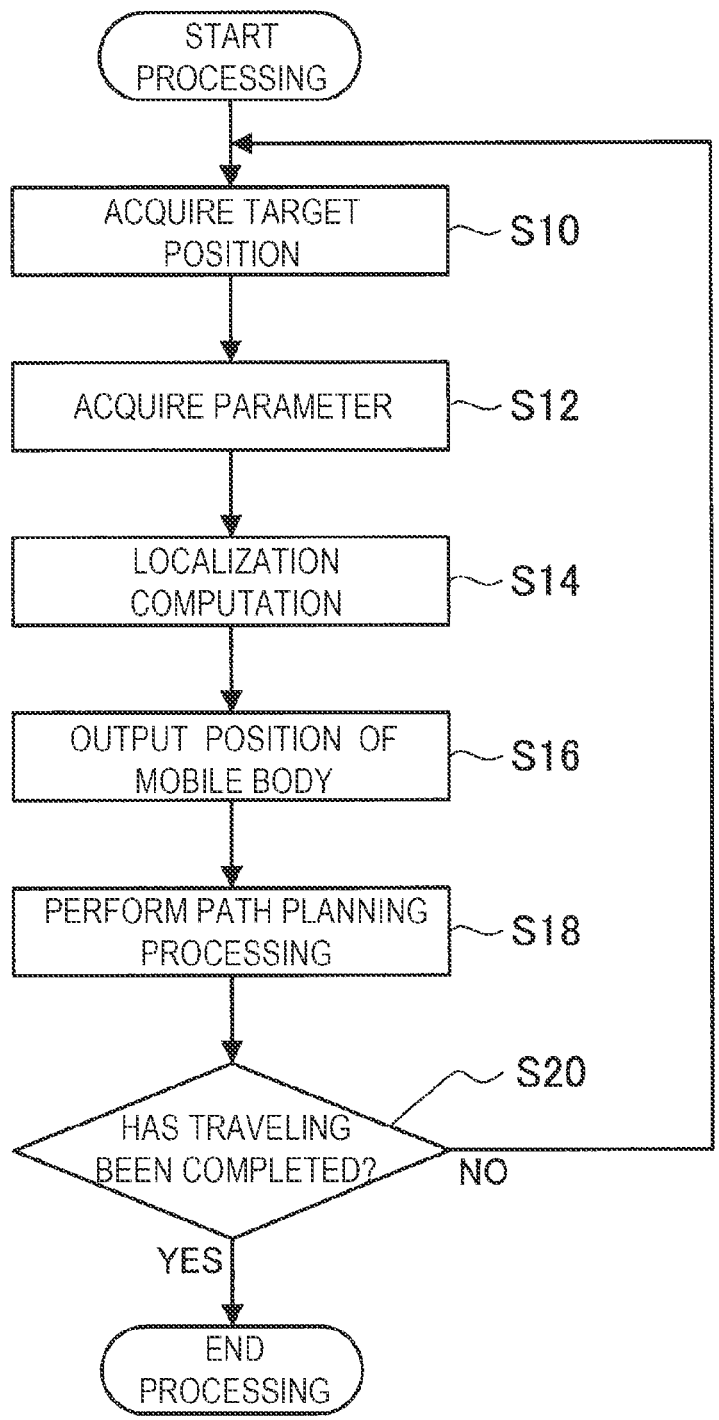
FIG. 5 is a flowchart showing processing in the case of embedding environmental information in the advance map.

FIG. 5 is a flowchart showing processing in the case of embedding environmental information in the advance map. First, in step S10, information (target position) about the target point 90 is acquired. Accordingly, the target positions 80 are sequentially defined on the traveling path of the mobile body 10. In next step S12, a parameter to be utilized for localization, selected by the parameter selection unit 500 on the basis of the target position 80, is acquired from the advance map in which the environmental information has been embedded. In next step S14, localization computation is performed on the basis of the parameter acquired in step S12. In next step S16, the estimated position of the mobile body is output, and in next step S18, path planning processing is performed on the basis of the position of the mobile body. In next step S20, it is determined whether or not traveling to the target point 90 has been completed, and in a case where traveling has been completed, the process is terminated. On the other hand, in a case where traveling has not been completed, return is made to step S10.

5.2. Case in which Mobile Body Itself Recognizes Environment

Next, a case in which the mobile body 10 itself recognizes the environment will be described. The mobile body 10 itself can recognize the environment with identification devices mounted. Examples of an identifier include an identification device that monitors a road surface condition, an identification device that monitors whether or not the sky is hidden by buildings, and an identification device that monitors whether there is no obstacle of a material that transmits light.

The mobile body 10 selects a profile in which parameters for localization suited to the environment have been set, in accordance with a combination of identified information. For example, by indicating an identification result obtained by each of the identification devices by two values of "0" and "1", and setting a profile in accordance with their combination in advance, a profile in accordance with an environment identification result can be selected. The profile is a list of parameters for localization, and a parameter list of representative environments is generated in advance, and is supplied to a database of the mobile body 10. The mobile body 10 determines environment identification information, and selects an appropriate profile included in the database to dynamically change the parameter for localization.

Figure 6:
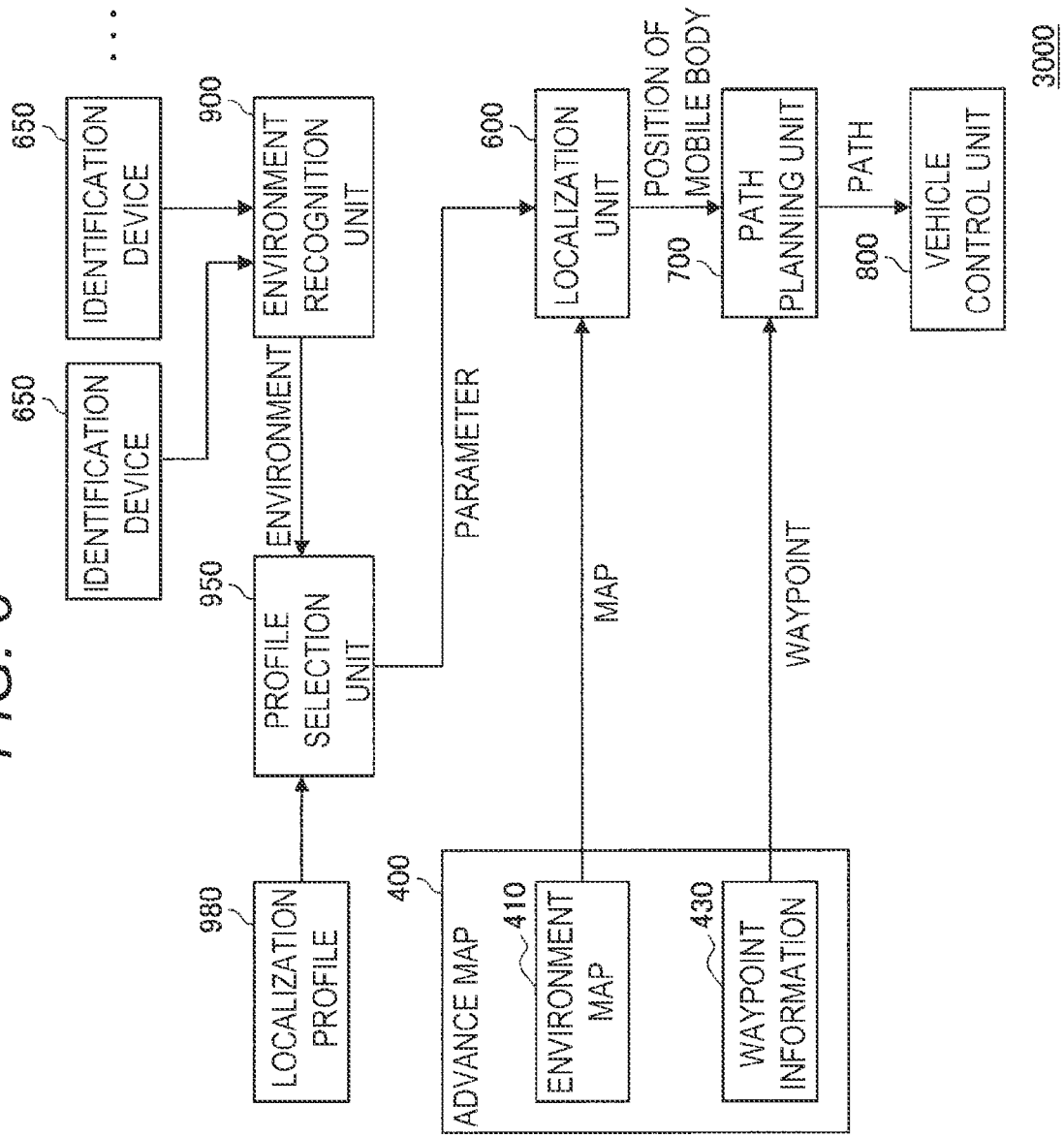
FIG. 6 is a schematic view showing a configuration of a system in a case where a mobile body itself recognizes an environment.

FIG. 6 is a schematic view showing a configuration of a system 3000 in a case where a mobile body itself recognizes the environment. As shown in FIG. 6, the system 3000 has an identification device 650, an environment recognition unit 900, a profile selection unit (parameter changing unit) 950, a localization profile 980, the advance map 400, the localization unit 600, the path planning unit 700, and the vehicle control unit 800. The advance map 400 includes the environment map 410 and the waypoint information 430.

The environment recognition unit 900 determines in what kind of traveling environment the mobile body 10 is currently traveling on the basis of identification results obtained by a plurality of identification devices 650, and makes a classification. Here, classes are obtained by classifying representative environments such as an environment in which it is difficult to use the GPS 140 and an environment in which it is difficult to use the wheel odometry 110.

The identification device 650 mainly receives an image as an input, and determines by machine learning or the like in advance whether a feature requested to be extracted appears in an image, and makes a notification to the environment recognition unit 900 that performs processing of determining a class. Machine learning herein assumes, for example, learning in which an image is input to determine whether a feature is included, such as deep learning or a method of matching a template image. The environment recognition unit 900 integrates identification results obtained by the large number of identification devices 650, and makes a classification about which profile the environment utilizes. Deep learning can also be used for the classification.

The profile selection unit 950 selects a localization profile 980 suited to a classified environment, and sends the localization profile 980 to the localization unit 600. The localization unit 600 performs localization processing using parameters of the localization profile 980. Thereafter, the path planning unit 700 generates a path, and the vehicle control unit 800 controls the mobile body 10.

Figure 7:
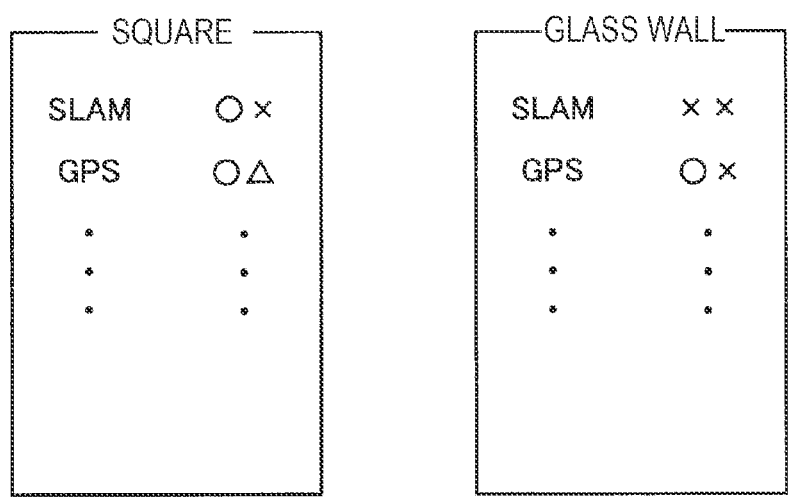
FIG. 7 is a schematic view showing an example of localization profile.

FIG. 7 is a schematic view showing an example of the localization profile 980. As shown in FIG. 7, in the localization profile 980, localization-related parameters such as covariance values of the SLAM 130, the GPS 140, and the like are defined in advance in accordance with the environment determined by the environment recognition unit 900. Note that the example of FIG. 7 shows the square 30 and the glass walls 52 as an example of a profile in accordance with the traveling environment. In accordance with identification results obtained by the plurality of identification devices described above, it is determined whether the traveling environment is the square 30 or the glass walls 52 shown in FIG. 7. In a case where it is determined that the traveling environment is the square 30, the profile for "square" shown in FIG. 7 is selected. In this profile for "square", covariance values of the SLAM 130, the GPS 140, and the like, as well as parameters for various sensors for localization are set in advance. Consequently, by selecting a profile in accordance with the traveling environment, a parameter for localization can be acquired.

Figure 8:
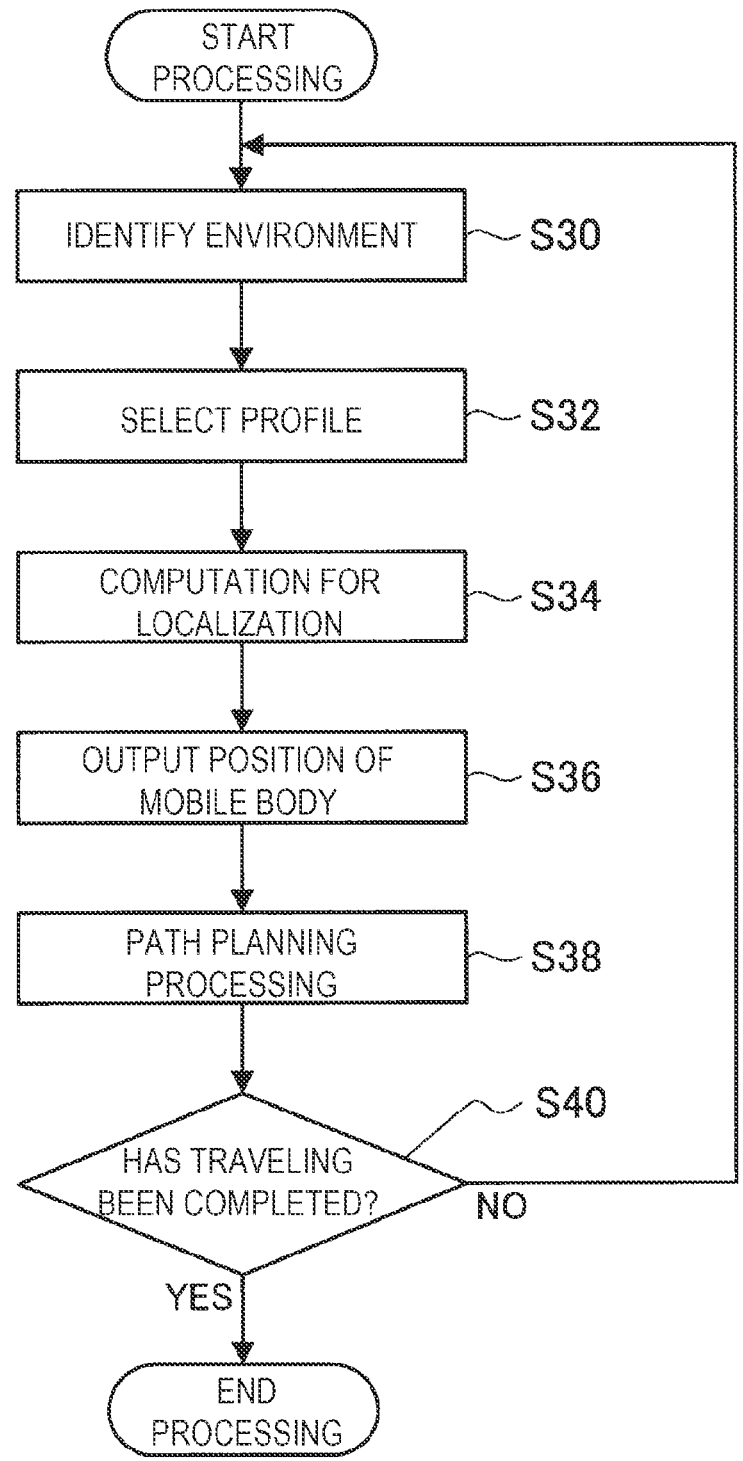
FIG. 8 is a flowchart showing processing in a case where a mobile body itself recognizes an environment.

FIG. 8 is a flowchart showing processing in a case where the mobile body itself recognizes an environment. First, in step S30, the environment recognition unit 900 identifies the environment. In next step S32, the profile selection unit 950 selects the localization profile 980 in accordance with an environment determination result. In next step S34, computation for localization is performed on the basis of the localization profile 980 selected in step S32. In next step S36, the position of the mobile body is output on the basis of a result of computation in step S34. In next step S38, path planning processing is performed on the basis of the position of the mobile body. In next step S40, it is determined whether or not traveling to the target point 90 has been completed, and in a case where traveling has been completed, the process is terminated. On the other hand, in a case where traveling has not been completed, return is made to step S30.

5.3. Example of Embedding Environmental Information in Advance Map and Performing Path Planning in Accordance with Sensor Situation By embedding parameters for localization in the environment map, an optimum path can be selected from the current sensor situation of the mobile body 10. For example, in a case of going to a certain destination, assume that there are two alternatives of an indoor path which is the shortest path but is surrounded by the glass walls 52 and a path which is indirect but is outdoors with the open sky. In this case, when the former path is selected, the mobile body 10 will travel mainly using the wheel odometry 110 and the IMU 100. On the other hand, when the latter path is selected, the mobile body 10 will travel mainly using the GPS 140, the wheel odometry 110, and the IMU 100.

In a case where all sensors can be utilized without any problem, it is desirable to travel along the former path as the shortest path. On the other hand, in a case where the wheel odometry 110 has been failed, it is predicted that localization cannot be performed with the former path.

Thus, in a case where a failure of the wheel odometry 110 is considered, it is desirable to travel along the latter path. By embedding parameters for localization in the advance map, it is also possible to dynamically switch between the traveling paths while referring to a sensor situation of the mobile body 10. That is, by embedding parameters in the advance map in advance, a path on which the position of the mobile body is less likely to be lost can be selected even in a case where there is a failed sensor.

Figure 9:
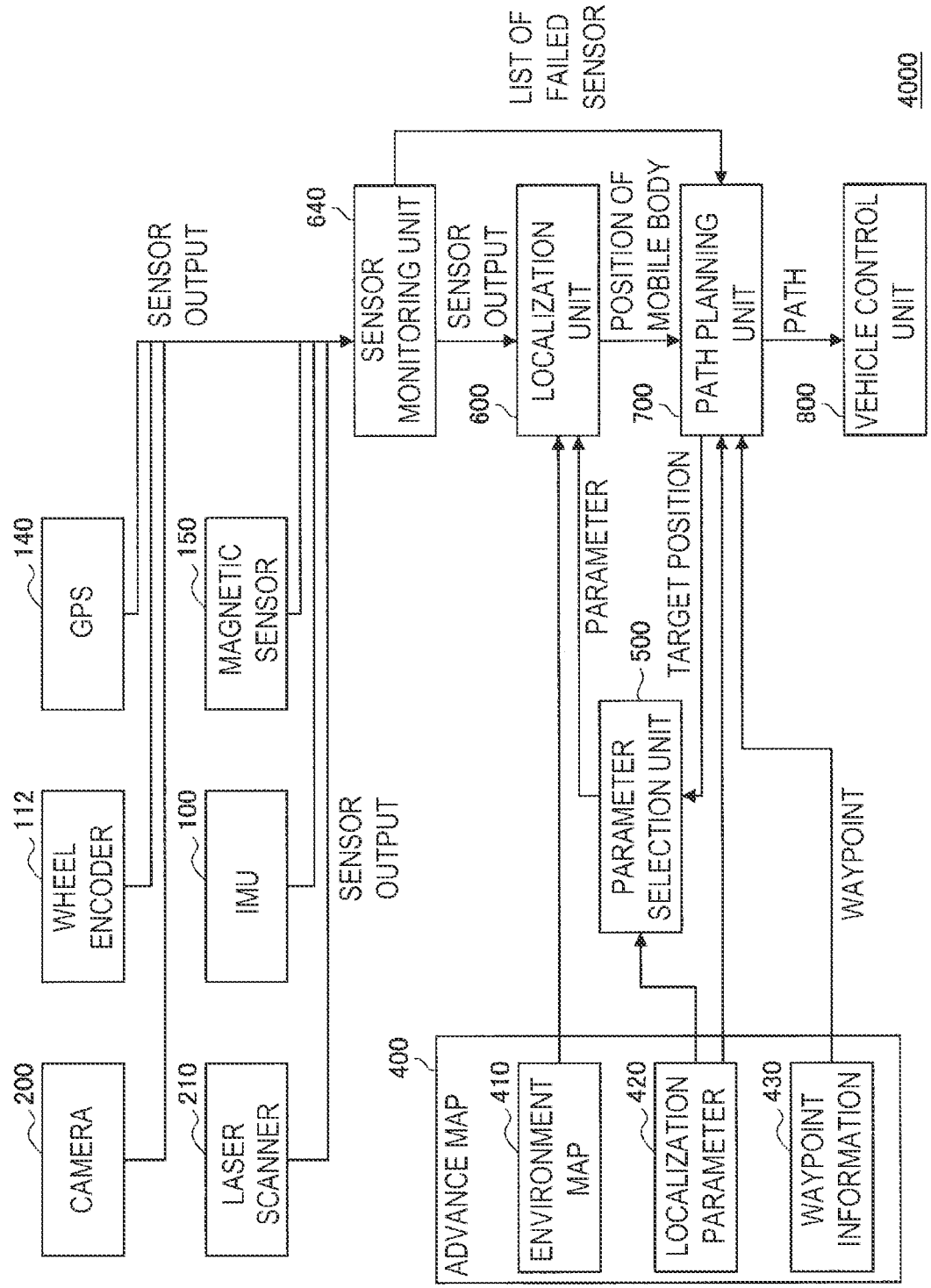
FIG. 9 is a schematic view showing a configuration of a system in a case of performing path planning in accordance with a map having parameters embedded and a sensor situation.

FIG. 9 is a schematic view showing a configuration of a system 4000 in a case of performing path planning in accordance with a map having parameters embedded and a sensor situation. As shown in FIG. 9, the system 4000 has a sensor monitoring unit 640 in addition to the configuration of FIG. 4. FIG. 9 depicts various sensors such as the camera 200, the laser scanner 210, a wheel encoder 112, the IMU 100, the GPS 140, and the magnetic sensor 150 in addition to the sensor monitoring unit 640. Note that the wheel encoder 112 is used in the wheel odometry 110. The sensor monitoring unit 640 monitors the various sensors such as the camera 200, the laser scanner 210, the wheel encoder 112, the IMU 100, the GPS 140, and the magnetic sensor 150. When it is determined that these sensors have been failed, the sensor monitoring unit 640 makes a notification to the path planning unit 700.

For example, if any sensor continues outputting outliers, the sensor monitoring unit 640 notifies the path planning unit 700 of a failure flag of that sensor. The path planning unit 700 refers to the parameters embedded in the advance map to select such a target position that the position of the mobile body is not lost with a configuration excluding the failed sensor. In a case where the covariance of a parameter embedded in the map is small for the sensor (failed sensor) for which a failure flag has been set up, the position of the mobile body is highly likely to be lost, so that another target position is selected, and path planning calculation is performed again. In this manner, a path on which the position of the mobile body is less likely to be lost can be selected in accordance with the sensor situation by using the map having parameters embedded.

Figure 10:
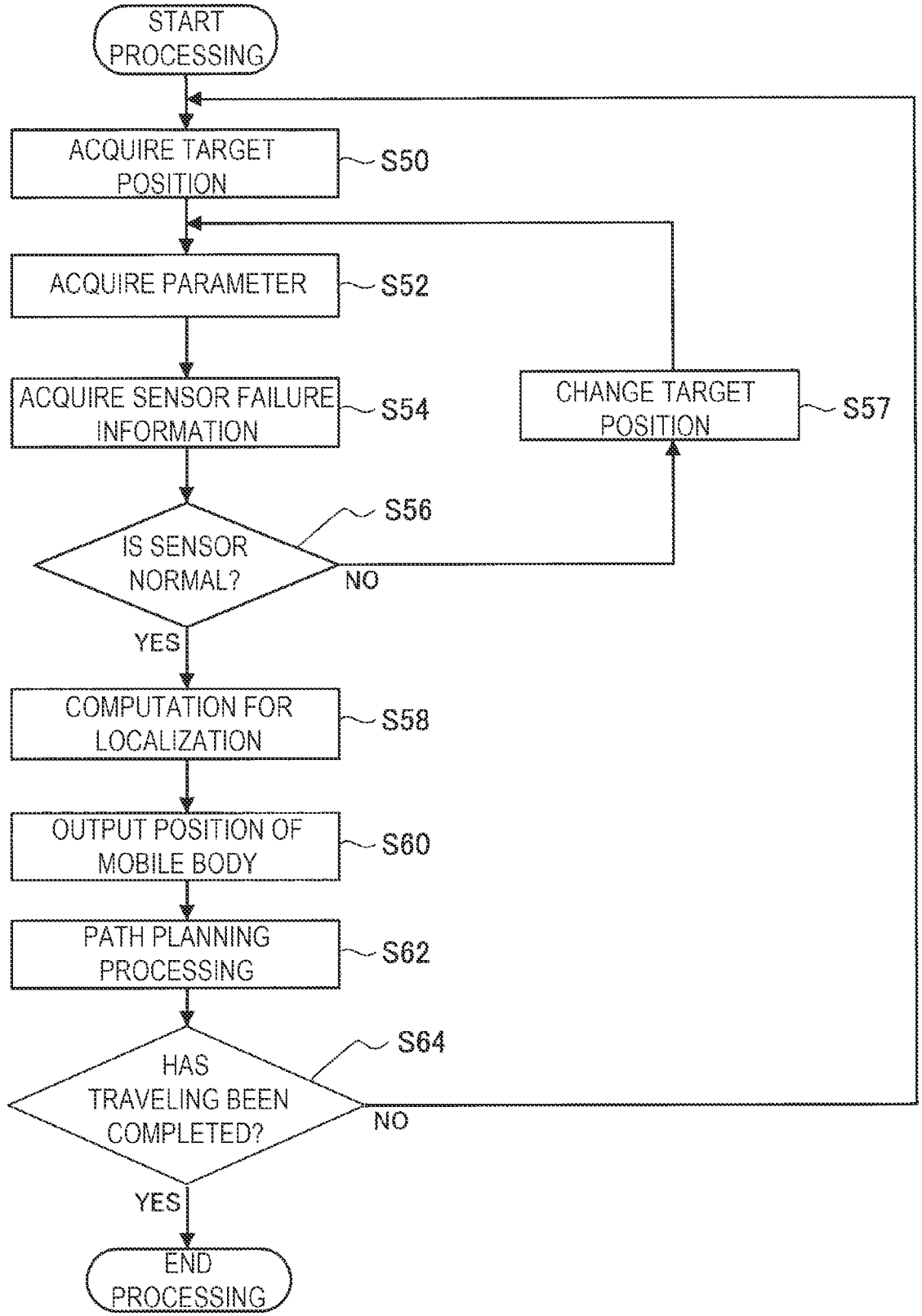
FIG. 10 is a flowchart showing processing in the case of performing path planning in accordance with the map having parameters embedded and the sensor situation.

FIG. 10 is a flowchart showing processing in a case of performing path planning in accordance with the map having parameters embedded and a sensor situation. First, in step S50, information (target position) about the target point 90 is acquired. Accordingly, the target positions 80 are sequentially defined on the traveling path of the mobile body 10. In next step S52, a parameter to be utilized for localization, selected by the parameter selection unit 500 on the basis of the target positions 80, is acquired from the advance map in which the environmental information has been embedded. In next step S54, the sensor monitoring unit 640 acquires sensor failure information. In next step S56, it is determined whether or not the sensor is normal on the basis of the sensor failure information, and in a case where the sensor is normal, the process proceeds into step S58. In step S58, computation for localization is performed. On the other hand, in a case where the sensor is abnormal, the process proceeds into step S57, and after changing the target position, return is made to step S52.

The process proceeds into step S60 after step S58, and the estimated position of the mobile body is output. In next step S62, path planning processing is performed on the basis of the position of the mobile body. In next step S64, it is determined whether or not traveling to the target point 90 has been completed, and in a case where traveling has been completed, the process is terminated. On the other hand, in a case where traveling has not been completed, return is made to step S50.

The present disclosure can be applied to various platforms in addition to a wheel-type mobile body. As long as an autonomous mobile body such as an autonomous car, a personal mobility, a humanoid, or a drone senses to perform localization, the application range is not particularly limited. In a mobile body to which the present disclosure has been applied, a phenomenon in which a localization result includes an error under a specific environment and a phenomenon in which an autonomous movement can no longer be performed accordingly are significantly improved. Since a parameter specially designed for an environment can be changed dynamically, the localization accuracy is improved and robustness can be improved in each environment.

As an effect obtained by improvement in localization accuracy and robustness, an effect of improvement in path followability in which the localization accuracy with respect to a path of the mobile body is improved, so that finer vehicle control can be made is obtained. In addition, in a flying platform such as a drone, the stopping accuracy at the time of hovering is improved, and improvement in stopping accuracy, such as stabilization of flying shooting, can be achieved. Further, with the improvement in robustness, environments that can be adapted to in a single travel increase, so that a range that can be traveled in a single travel is enlarged, and enlargement of the range that can be traveled can be achieved.

The localization technology is an important factor that improves basic performance of a mobile body. The present disclosure significantly contributes to the application development through use of a mobile body which will be further accelerated in the future by improving basic performance.

Embodiment(s) of the present disclosure have been described above with reference to the accompanying drawings, however the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1) A mobile body including:
a localization unit configured to estimate a position of the mobile body on the basis of a parameter for localization; and
a parameter changing unit configured to dynamically change the parameter in accordance with a traveling environment in which the mobile body is traveling.

(2) The mobile body according to (1), in which the parameter is a parameter corresponding to a sensor used for the localization, a value of covariance in an extended Kalman filter that fuses a plurality of schemes for localization, or a set value in each of the schemes.

(3) The mobile body according to (1) or (2), in which the parameter is a parameter corresponding to IMU, wheel odometry, visual odometry, SLAM, or GPS used for the localization.

(4) The mobile body according to any one of (1) to (3), in which the parameter is defined in advance in correspondence with waypoint information in an environment map, and
the parameter changing unit applies a waypoint of a traveling path to the waypoint information to change the parameter.

(5) The mobile body according to any one of (1) to (4), further including: an environment recognition unit configured to recognize the traveling environment at a time of traveling, in which
the parameter changing unit changes the parameter in accordance with the traveling environment recognized at the time of traveling.

(6) The mobile body according to any one of (1) to (5), in which a profile of the parameter in accordance with the traveling environment is registered in advance, and
the parameter changing unit changes the parameter on the basis of the profile obtained from the traveling environment recognized at the time of traveling.

(7) The mobile body according to any one of (1) to (6), in which the parameter is defined in advance in correspondence with waypoint information in an environment map, and
the parameter changing unit applies a waypoint of a traveling path to the waypoint information to change the parameter,
the mobile body further including: a sensor monitoring unit configured to monitor a state of a sensor used for the localization; and
a path selection unit configured to select a path on the basis of the parameter in a different traveling path and a state of the sensor corresponding to the parameter.

(8) A method of controlling a mobile body, including:
estimating a position of the mobile body on the basis of a parameter for localization; and
dynamically changing the parameter in accordance with a traveling environment in which the mobile body is traveling.

(9) A program for causing a computer to function as:
means for estimating a position of the mobile body on the basis of a parameter for localization; and
means for dynamically changing the parameter in accordance with a traveling environment in which the mobile body is traveling.

(10) A mobile body controller including:
circuitry configured to
recognize an environment surrounding a mobile body to be controlled, and
change parameters used for self-position estimation by the mobile body based on the recognized environment.

(11) The mobile body controller according to (10), wherein the circuitry recognizes the environment surrounding the mobile body by recognizing a traveling environment in which the mobile body travels.

(12) The mobile body controller according to (10) or (11), wherein the traveling environment includes a planned path from a current position of the mobile body to a target position of the mobile body.

(13) The mobile body controller according to any one of (10) to (12), wherein the circuitry recognizes the environment surrounding the mobile body by recognizing at least one of a ground surface condition, a presence of buildings around the mobile body, or a presence of materials that transmit light around the mobile body.

(14) The mobile body controller according to any one of (10) to (13), wherein the circuitry recognizes the environment surrounding the mobile body by recognizing whether wheels of the mobile body are likely to slip.

(15) The mobile body controller according to any one of (10) to (14), wherein the changed parameters used for self-position estimation relate to at least one of wheel odometry, simultaneous localization and mapping (SLAM), map matching, a laser scanner, or a global positioning system (GPS) used to estimate a position of the mobile body.

(16) The mobile body controller according to any one of (10) to (15), wherein the changed parameters used for self-position estimation relate to a localization profile.

(17) The mobile body controller according to any one of (10) to (16), wherein the environment surrounding the mobile body is recognized using one or more sensors included in the mobile body.

(18) A mobile body including:
one or more sensors; and
a mobile body controller, the mobile body controller including circuitry configured to
recognize an environment surrounding the mobile body controlled by the mobile body controller, and
change parameters used for self-position estimation by the mobile body based on the recognized environment.

(19) A mobile body control method including:
recognizing an environment surrounding a mobile body to be controlled; and
changing parameters used for self-position estimation by the mobile body based on the recognized environment.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

500 Parameter selection unit
600 Localization unit

The invention claimed is:
1. A mobile body controller comprising:
circuitry configured to
recognize an environment surrounding a mobile body to be controlled, and
change one or more parameters to determine a weight of each sensor used for self-position estimation by the mobile body based on a determined class at each point along a planned path of the mobile body through the recognized environment,
wherein the class is determined based on an input image used to recognize the environment,
wherein the determined class of the recognized environment is determined based on a degree of slip associated with a recognized ground surface condition at each point along the planned path of the mobile body, and
wherein the circuitry changes at least one parameter to determine a weight of wheel odometry used for the self-position estimation according to the degree of slip associated with the recognized ground surface condition at each point along the planned path of the mobile body.

2. The mobile body controller according to claim 1, wherein the circuitry recognizes the environment surrounding the mobile body by recognizing a traveling environment in which the mobile body travels.

3. The mobile body controller according to claim 2, wherein the traveling environment includes the planned path from a current position of the mobile body to a target position of the mobile body.

4. The mobile body controller according to claim 1, wherein the determined class of the recognized environment is further determined by recognizing at least one of a presence of buildings around the mobile body or a presence of materials that transmit, reflect, or diffract light around the mobile body.

5. The mobile body controller according to claim 1, wherein the circuitry recognizes the environment surrounding the mobile body by recognizing whether wheels of the mobile body are likely to slip.

6. The mobile body controller according to claim 1, wherein the one or more changed parameters used for self-position estimation further relate to at least one of simultaneous localization and mapping (SLAM), map matching, a laser scanner, or a global positioning system (GPS) used to estimate a position of the mobile body.

7. The mobile body controller according to claim 1, wherein the one or more changed parameters used for self-position estimation relate to a localization profile.

8. The mobile body controller according to claim 1, wherein the environment surrounding the mobile body is recognized using one or more sensors included in the mobile body.

9. A mobile body comprising:
one or more sensors; and
a mobile body controller, the mobile body controller including circuitry configured to
recognize an environment surrounding the mobile body controlled by the mobile body controller, and
change one or more parameters to determine a weight of each sensor used for self-position estimation by the mobile body based on a determined class at each point along a planned path of the mobile body through the recognized environment,
wherein the class is determined based on an input image used to recognize the environment,
wherein the determined class of the recognized environment is determined based on a degree of slip associated with a recognized ground surface condition at each point along the planned path of the mobile body, and wherein at least one parameter is changed to determine a weight of wheel odometry used for the self-position estimation according to the degree of slip associated with the recognized ground surface condition at each point along the planned path of the mobile body.

10. A mobile body control method comprising:

recognizing an environment surrounding a mobile body to be controlled; and changing one or more parameters to determine a weight of each sensor used for self-position estimation by the mobile body based on a determined class at each point along a planned path of the mobile body through the recognized environment, wherein the class is determined based on an input image used to recognize the environment, wherein the determined class of the recognized environment is determined based on a degree of slip associated with a recognized ground surface condition at each point along the planned path of the mobile body, and wherein at least one parameter is changed to determine a weight of wheel odometry used for the self-position estimation according to the degree of slip associated with the recognized ground surface condition at each point along the planned path of the mobile body.

11. The mobile body controller according to claim 1, wherein the circuitry is further configured to acquire the input image.

12. The mobile body controller according to claim 1, wherein the circuitry changes the at least one parameter to determine the weight of the wheel odometry used for the self-position estimation such that a covariance of the wheel odometry with the self-position estimation is smaller as the degree of slip decreases.

* * * * *